(12) United States Patent
Tran et al.

(10) Patent No.: US 6,510,131 B1
(45) Date of Patent: Jan. 21, 2003

(54) DATA STORAGE DISK CARTRIDGE INCLUDING A SHUTTER ASSEMBLY WITH A STRESS RELIEF MECHANISM

(75) Inventors: Viet Nam Tran, Wahpeton, ND (US); Dean E. Sitz, Wahpeton, ND (US); Leo Walter Spychalla, Cottage Grove, MN (US)

(73) Assignee: Imation Corp., Oakdale, MN (US)

( * ) Notice: Subject to any disclaimer, the term of this patent is extended or adjusted under 35 U.S.C. 154(b) by 0 days.

(21) Appl. No.: 09/504,464

(22) Filed: Feb. 16, 2000

(51) Int. Cl.$^7$ .............................................. G11B 23/03
(52) U.S. Cl. ...................................................... 369/291
(58) Field of Search ............................. 369/291, 275.5; 360/132, 133; 206/307.1, 308.3, 308.1; 72/337

(56) References Cited

U.S. PATENT DOCUMENTS

| | | | | |
|---|---|---|---|---|
| 4,237,089 A | | 12/1980 | Kubat et al. ............... 264/328.1 |
| 4,698,714 A | * | 10/1987 | Sugawara et al. ........... 360/133 |
| 5,121,380 A | * | 6/1992 | Fujita et al. ................. 369/291 |
| 5,151,894 A | * | 9/1992 | Fujita .......................... 369/291 |
| 5,164,871 A | * | 11/1992 | Hughes et al. ............... 360/133 |
| 5,233,494 A | * | 8/1993 | Kikuchi ....................... 360/133 |
| 5,262,917 A | * | 11/1993 | Kikuhci et al. .............. 360/133 |
| 5,454,251 A | * | 10/1995 | Funawatari et al. ........... 72/337 |
| 5,761,015 A | * | 6/1998 | Oishi .......................... 360/133 |
| 5,811,133 A | | 9/1998 | Saito et al. .................. 425/145 |
| 5,858,414 A | | 1/1999 | Hayashi et al. ................ 475/73 |
| 5,889,639 A | * | 3/1999 | Swanson et al. ............. 360/133 |
| 5,944,308 A | | 8/1999 | McLeod et al. ............. 271/171 |
| 6,317,284 B1 | * | 11/2001 | Feng et al. .................... 360/46 |

FOREIGN PATENT DOCUMENTS

| | | | |
|---|---|---|---|
| JP | 61-255570 | * | 11/1986 |
| WO | WO 98/49684 | | 11/1998 |

\* cited by examiner

*Primary Examiner*—Brian E. Miller
*Assistant Examiner*—Tianjie Chen
(74) *Attorney, Agent, or Firm*—Eric D. Levinson

(57) ABSTRACT

A data storage disk cartridge including a shutter assembly with a stress relief mechanism. The disk cartridge includes a housing assembly having an opening for accessing a disk. A molded shutter assembly is operably connected to the housing assembly. The molded shutter assembly is moveable between a closed position across the opening and an open position allowing access to the disk by a disk drive. The molded shutter assembly includes a first sidewall, a second sidewall, and an endwall extending between the first sidewall and the second sidewall. A first joint is defined by the junction of the first sidewall and the endwall. A stress relief mechanism is positioned at the first joint whereby the first sidewall is maintained substantially parallel to the second sidewall after removal from a molding process die assembly.

29 Claims, 5 Drawing Sheets

DATA STORAGE DISK CARTRIDGE INCLUDING A SHUTTER ASSEMBLY WITH A STRESS RELIEF MECHANISM

TECHNICAL FIELD

The present invention relates to data storage. In particular, the present invention is a data storage cartridge used to house a data storage disk having a shutter assembly with a stress relief mechanism.

BACKGROUND OF THE INVENTION

Optical storage devices are an alternative technology to conventional magnetic technology because of their high density data storage. In optical recording, data is represented as an optically readable domain on a recording medium such as an optical disk. Optically readable data can be recorded on a disk using a variety of mechanical or optical techniques.

Debris is a significant concern in data recording systems. Debris degrades the optical and/or mechanical performance of an optical disk and optical disk drive. For example, debris can undesirably attenuate the beams used for read or write operations, cause loss of tracking, disk tilt, loss of data and in some cases, drive head crashes (i.e., physical contact of the head with the disk surface). Data storage problems attributable to debris become more pronounced as media aerial density increases and disk tracking tolerances are reduced.

To alleviate the problems introduced by debris, many types of cartridges have been developed for housing data storage disks. Disk storage cartridges include a housing assembly that provides a system of partially redundant barriers that significantly reduce the possibility of debris accumulation on a disk surface.

One known disk cartridge includes a housing having an opening to access a disk contained therein. A shutter assembly is operably coupled to the housing. During operation of the drive the shutter assembly is in an open position, allowing the drive to access the disk surface. When not in operation the shutter assembly is in a closed position over the opening in the housing to protect the disk surface and reduce the accumulation of debris on the disk surface.

The data cartridge components are preferably manufactured in high volume via an injection molding process using a thermal plastic, such a polycarbonate, as the molding material. Generally, for molding plastic by an injection molding machine, the process from closing the die to opening the die to take out the moldings is usually repeated as one production cycle. The time required for the one production cycle depends principally on injection time and cooling time. For achieving an improved productivity, acceleration of the production cycle by shortening the cooling time is utilized.

However, shortening the cooling time within the die can result in moldings which deform or warp after being taken out of the die. In FIG. 1, a prior art shutter assembly used with a disk cartridge is illustrated. The shutter assembly 20 includes a first sidewall 22, a second sidewall 24, an endwall 26, a first interior corner 28 and a second interior corner 30. In reference also to FIG. 2, after injection molding of the thermal plastic, the die is cooled. During cooling of the die, the outside surface 32 of shutter assembly 20 tends to cool at a different rate than the interior surface 34. When the shutter assembly 20 is removed from the die, the internal stresses present at first interior corner 28 and second interior corner 30 (e.g., due to uneven cooling temperatures and sharp corner mold flow directions) tend to undesirably pull first sidewall 22 and second sidewall 24 together (as indicated by arrows 36A, 36B and 36C). As such, it is desirable to provide a shutter assembly design such that after the shutter assembly is removed from the die in the mold process, the first sidewall remains substantially parallel to the second sidewall.

SUMMARY OF THE INVENTION

The present invention provides a disk cartridge for use with a disk drive. This disk cartridge includes a housing assembly having an opening for accessing a disk and a molded shutter assembly operably connected to the housing assembly. The molded shutter assembly is moveable between a closed position across the opening, and an open position allowing access to the disk by a disk drive. The molded shutter assembly includes a first sidewall, a second sidewall, and an endwall extending between the first sidewall and the second sidewall. A first joint is defined by the junction of the first sidewall and the endwall. A stress relief mechanism is positioned at the first joint such that the first sidewall is controllably maintained in a desired position relative to the second sidewall after removal from a mold assembly. In one aspect, the first sidewall is maintained substantially parallel to the second sidewall after removal of the molded shutter assembly from a mold assembly.

In one embodiment of the present invention, a disk is operably positioned within the housing assembly. In one aspect, the stress relief mechanism is molded integral to the molded shutter assembly and is geometrically shaped. In one aspect, the stress relief mechanism is a depression. At least a portion of the stress relief mechanism is formed in the endwall. Alternatively, at least a portion of the stress relief mechanism is formed in the first sidewall, or at least a portion of the stress relief mechanism may be formed in the first sidewall and the endwall.

The shutter assembly is made of a polymeric material, such as acetyl, and formed by injection molding. A second joint is defined by the junction of the second sidewall and the endwall. A second stress relief mechanism is positioned at the second joint. The second stress relief mechanism extends along the length of the second joint. Either of the first or second joints may be rounded. The disk cartridge may further include an outer housing operably positioned about the housing assembly.

In another embodiment, the present invention provides a disk cartridge. The disk cartridge includes a housing assembly having an opening for accessing a disk. A molded shutter assembly is operably connected to the housing assembly. The molded shutter assembly is moveable between a closed position across the opening and an open position allowing access to the disk by a disk drive. The molded shutter assembly includes a first sidewall, a second sidewall, and an endwall extending between the first sidewall and the second sidewall. A first joint is defined by the junction of the first sidewall and the endwall. Means are provided for relieving stress between the first sidewall and the endwall, positioned at the first joint, whereby the first sidewall is maintained substantially parallel to the second sidewall after removal from a mold assembly.

In one aspect, the means for relieving stress is molded integral the molded shutter assembly. The disk cartridge includes a disk operably positioned within the housing assembly.

In another embodiment, the present invention provides a disk cartridge including a housing assembly having an opening for accessing a disk, and a molded shutter assembly operably connected to the housing assembly. The molded shutter assembly is moveable between a closed position across the opening and an open position allowing access to the disk by a disk drive. The molded shutter assembly includes a first sidewall having a first major surface, a second sidewall having a second major surface, and an endwall extending between the first sidewall and second sidewall. The endwall has a third major surface. A first interior joint is defined by the junction of the first major surface and the third major surface. A surface depression is positioned at the first interior joint maintaining the first sidewall substantially parallel to the second sidewall after removal from a mold assembly.

In one aspect, the surface depression is geometrically shaped, and molded integral to the molded shutter assembly. The surface depression may be substantially round. At least a portion of the surface depression may be formed in the first major surface, the third major surface, or the first and third major surfaces.

A second interior joint is defined by the junction of the second major surface and the third major surface. The second surface depression is positioned at the second interior joint. In one embodiment the first surface depression extends along the length of the first interior joint. In another embodiment, the endwall is generally arc shaped.

DETAILED DESCRIPTION

Figure 1:
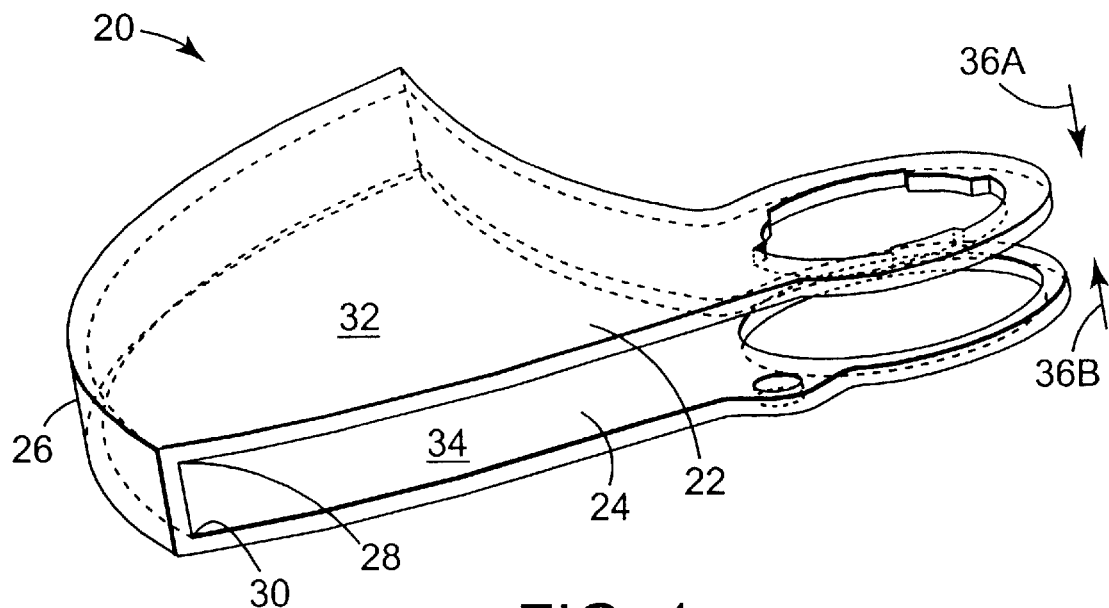
FIG. 1 is a perspective view of a prior art data storage disk cartridge shutter assembly.
Figure 2:
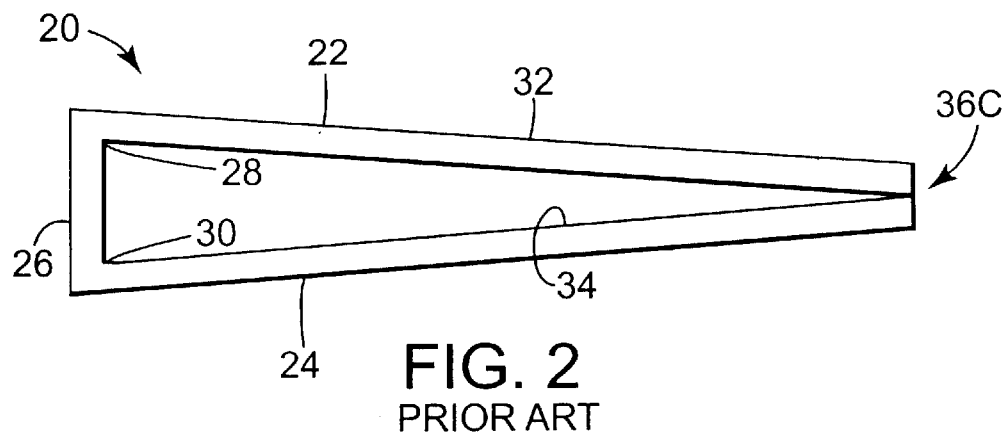
FIG. 2 is an edge view of the prior art data storage disk cartridge shutter assembly of FIG. 1.
Figure 3:
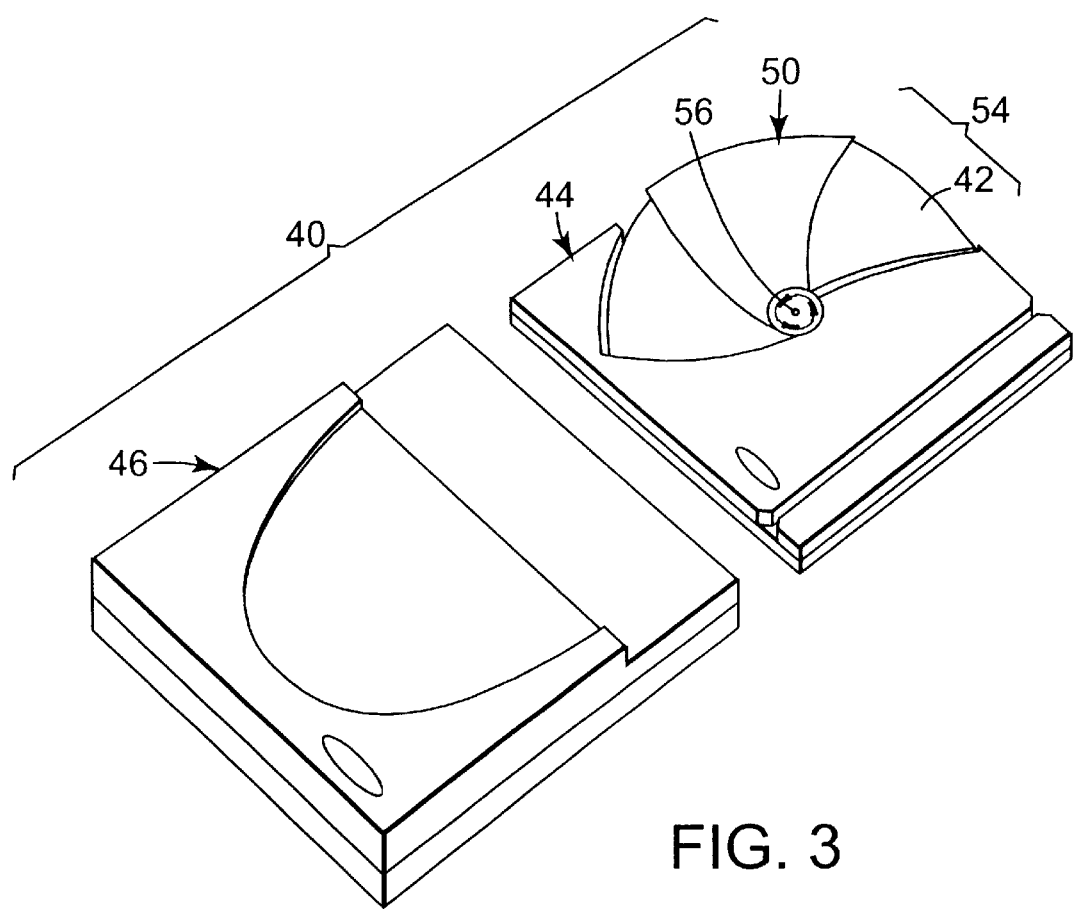
FIG. 3 is a perspective view illustrating one exemplary embodiment of a data storage disk cartridge employing a shutter assembly having a stress relief mechanism in accordance with the present invention.

In FIG. 3, a data storage disk cartridge assembly 40 including a shutter assembly with a stress relief mechanism in accordance with the present invention is generally shown. The stress relief mechanism allows for process control of the position of the sides of the shutter assembly. In particular, the stress relief mechanism allows for the sides of the shutter assembly to be substantially parallel, or controlled to be close together or farther apart. In one exemplary embodiment shown, data storage disk cartridge assembly 40 is a dual-housing data storage disk cartridge. Alternatively, the data storage disk cartridge including a shutter assembly with a stress relief mechanism in accordance with the present invention may be a single housing or other multi-housing disk cartridge. Disk cartridge assembly 40 includes a disk 42, an inner housing 44 that contains disk 42 and an outer housing 46 that contains inner housing 44. In some applications, inner housing 44 alone, i.e., without outer housing 46, may be used as a single-housing, data storage disk cartridge assembly. During storage or transport, outer housing 46 protects inner housing 44 and disk 42 from debris. To allow a disk drive to access disk 42, inner housing 44 is at least partially removable from outer housing 46. Cartridge assembly 40 is useful in a variety of recording applications, but is particularly advantageous for optical recording applications involving high aerial densities highly sensitive to debris, including "air incident" formats.

Inner housing 44 includes a shutter assembly 50 that is moveable to uncover a section of disk 54 for access by head (e.g., read/write) components associated with a disk drive (not shown). During movement of inner housing 44 relative to outer housing 46, inner housing 44 and shutter assembly 50 protect disk 42 from debris that could undermine the optical and mechanical performance of disk 42. Cartridge assembly 40 is particularly useful for disks and recording techniques that require high aerial densities or thinner air bearings (i.e., read/write head fly heights). Disk 42 may comprise any of a variety of prerecorded or rewriteable disk media with a variety of formats and form factors, such as 2.5 inch, 3.5 inch, 5.25 inch, 120 mm, and 130 mm.

For disk drive access, shutter assembly 50 is moveable between open and closed positions to uncover and cover, respectively, an access area 54 adjacent a section of disk 42. In one embodiment, shutter assembly 50 is formed in a rotary configuration to rotate about a central mounting point 56. To minimize the introduction of debris, shutter assembly 50 preferably is moveable to the open position only when inner housing 44 is inserted into the disk drive. For operation, retracted inner housing 44 is accessed by appropriate components within the disk drive to spin up disk 42 and move shutter assembly 50 to its open position for access to disk 42 by one or more read/write heads.

In unloading inner housing 44 from the disk drive, components of the disk drive first remove the heads from disk 42, stop the rotation of disk 42, and close shutter assembly 50. Inner housing 44 is inserted into outer housing 46 for storage or transport. These barriers form a hierarchy of cleanliness, isolating inner disk 42 from the outside environment.

The dual-housing structure of disk cartridge assembly 50 of the present invention can significantly improve disk and disk drive reliability, especially for higher aerial recording densities or thinner air bearings between the disk surface and drive head. One dual-housing disk cartridge assembly suitable for use with the present invention is set forth in Bonn et al. International Patent Application No. PCT/US98/08500, entitled "Disk Cartridge with Dual Housing Structure", which is incorporated herein by reference.

Figure 4:
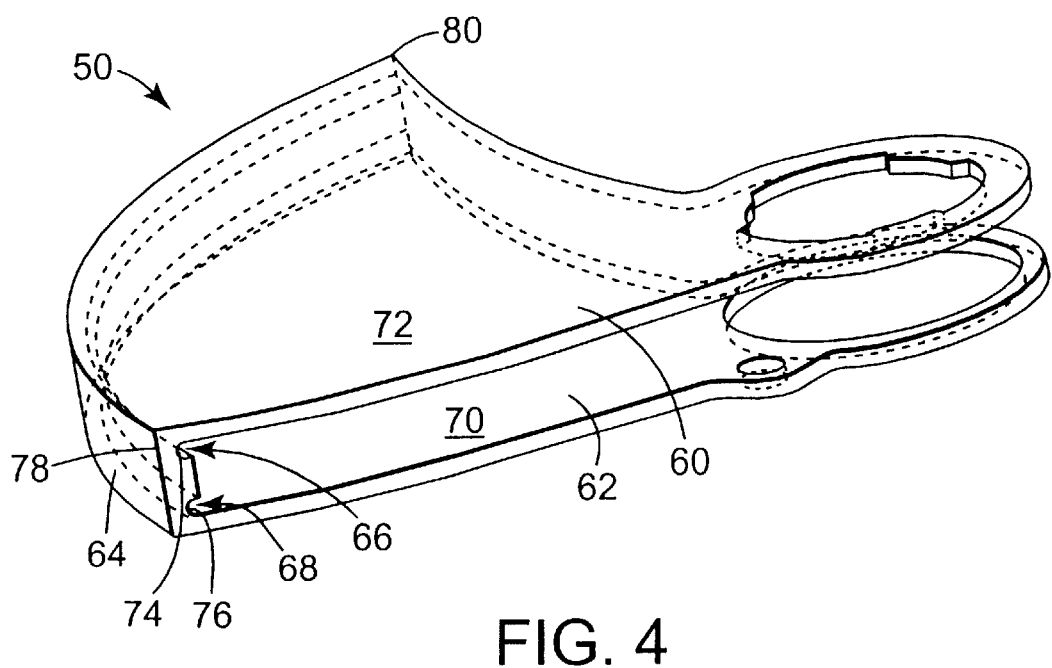
FIG. 4 is a perspective view illustrating one exemplary embodiment of a shutter assembly in accordance with the present invention.

In reference also to FIG. 4, molded shutter assembly 50 having a stress relief mechanism is shown. In particular, shutter assembly 50 includes a first sidewall 60, a second sidewall 62, and an endwall 64 extending between the first sidewall 60 and the second sidewall 62. In one aspect, the endwall 64 is circumferentially or arc-shaped. A first joint 66 is defined by the junction of the first sidewall 60 and the endwall 64. A second joint 68 is defined by the junction of the second sidewall 62 and the endwall 64. Shutter assembly 50 has an interior surface 70 and an exterior surface 72.

First stress relief mechanism 74 is positioned at first joint 66 and second stress relief mechanism 76 is positioned at second joint 68. In one aspect, first stress relief mechanism 74 and second stress relief mechanism 76 extend substantially between first end 78 and second end 80 of endwall 64. First stress relief mechanism 74 and/or second stress relief mechanism 76 relieve mold stress associated with first joint 66 and second joint 68, thereby providing for first sidewall 60 to maintain substantially parallel to second sidewall 62 after removal from a mold assembly. Alternatively, stress relief mechanism 74 and stress relief mechanism 76 can be process controlled to change the desired position of first sidewall 60 and second sidewall 62. In particular, by changing the shape (e.g., geometric shape, depth, etc.) of stress relief mechanisms 74, 76, the positions (inward or outward) of sidewalls 60, 62 are controlled, indicated by arrows 82, 84.

In particular, for light-weight, ease of fabrication and structural strength, shutter assembly 50 is preferably formed from an injection molding process using an injection molding polymeric or plastic material, such as polycarbonate. In one exemplary embodiment, the injection molded material is acetyl. One suitable material for molding shutter assembly 50 is commercially available under the Tradename BASF Ultraform W2320003 Acetal, having easy flowing and rapid freezing properties. After removal of the shutter assembly 50 from the die, first stress relief mechanism 74 and second stress relief mechanism 76 operate to relieve a stress phenomena at corresponding first joint 66 and second joint 68 which is present, such as due to the difference in cooling temperatures associated with interior surface 70 and exterior surface 72, and first joint 66 and second joint 68.

Figure 5:
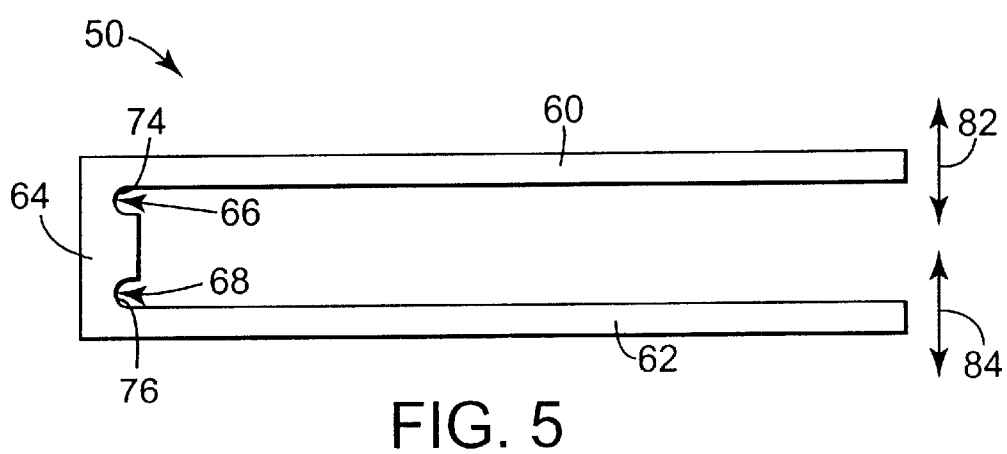
FIG. 5 is an edge view of the shutter assembly of FIG. 4.

FIG. 5 illustrates an edge view of the molded shutter assembly 50 shown in FIG. 4. In one preferred embodiment, first stress relief mechanism 74 and second stress relief mechanism 76 are formed integral the shutter assembly 50, and comprise a depression in interior surface 70. In one aspect, stress relief mechanisms 74, 76 are geometrically shaped, such as a partial circle. In one preferred embodiment, first stress relief mechanism 74 and second stress relief mechanism 76 are formed as depressions in endwall 64, adjacent sidewalls 60, 62, respectively. The location of first stress relief mechanism 74 and second stress relief mechanism 76 in endwall 64 provides for easy removal of disk cartridge assembly 40 from a molding die assembly.

Figure 6:
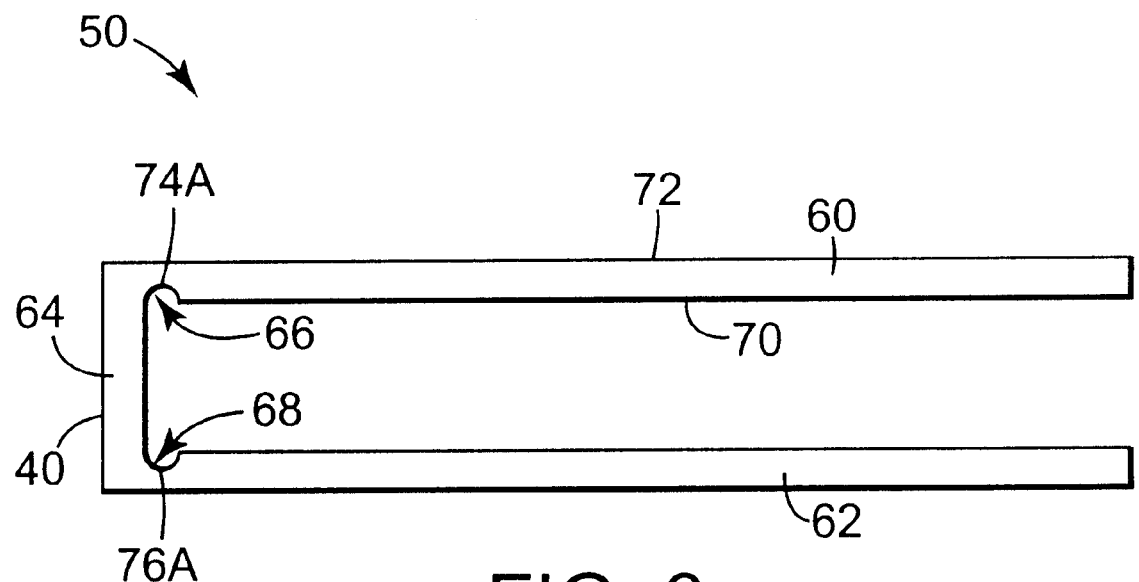
FIG. 6 is an edge view illustrating one alternative embodiment of a shutter assembly in accordance with the present invention.
Figure 7:
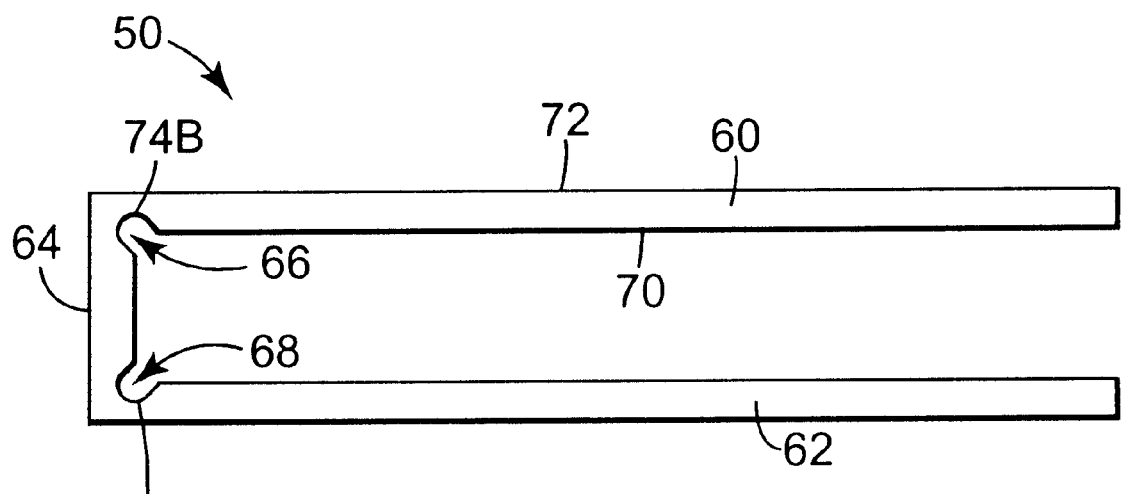
FIG. 7 is an edge view illustrating another alternative embodiment of a shutter assembly in accordance with the present invention.

In FIGS. 6–9, exemplary embodiments are shown illustrating alternative embodiments for shutter assembly 50 having a stress relief mechanism in accordance with the present invention. In FIG. 6, first stress relief mechanism 74A is a depression in the interior surface 70 of first sidewall 60. Second stress relief mechanism 76A is a depression in the interior surface 70 of second sidewall 62. In FIG. 7, first stress relief mechanism 74B is formed as a depression in the interior surface 70 of both first sidewall 60 and endwall 64. Second stress relief mechanism 76B is formed as a depression in interior surface 70 in both second sidewall 62 and endwall 64.

Figure 8:
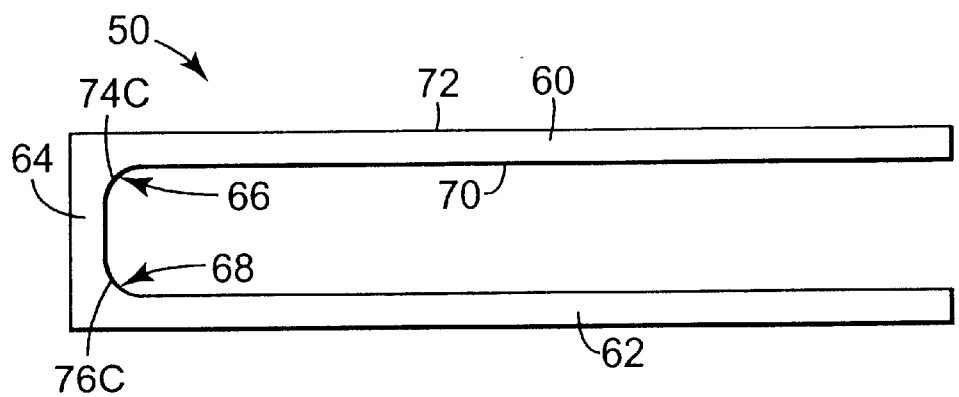
FIG. 8 is an edge view illustrating another alternative embodiment of a shutter assembly in accordance with the present invention.
Figure 9:
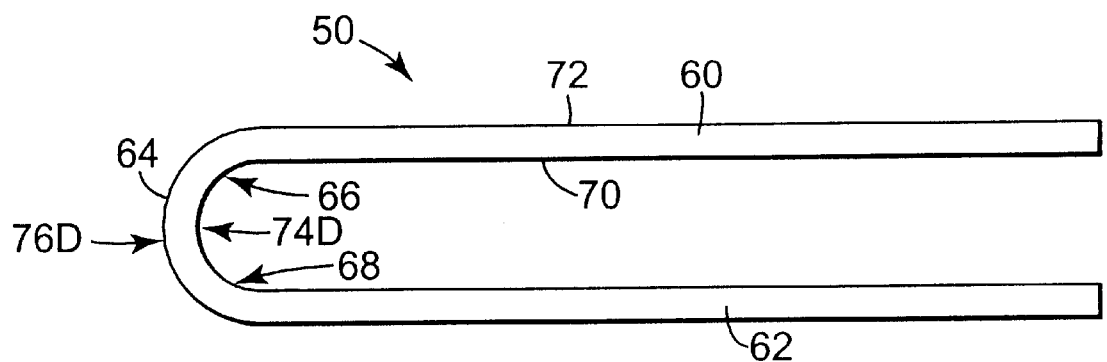
FIG. 9 is an edge view illustrating another alternative embodiment of a shutter assembly in accordance with the present invention.

In FIG. 8, first stress relief mechanism 74C is defined by the rounding-off of the sharp corner transition of first joint 66 defined by first sidewall 60 and endwall 64. Second stress relief mechanism 76C is defined by the rounding-off of the sharp corner transition of second joint 68 defined by second sidewall 62 and endwall 64. In FIG. 9, first stress relief mechanism 74D is defined by a concave shaped interior surface 70 of endwall 64. Second stress relief mechanism 76D is defined by a convex shaped exterior surface 72 of endwall 64.

Although specific embodiments have been illustrated and described herein for purposes of description of the preferred embodiment, it will be appreciated by those of ordinary skill in the art that a wide variety of alternate and/or equivalent implementations calculated to achieve the same purpose may be substituted for the specific embodiments shown and described without departing from the scope of the present invention. Those with skill in the art will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A data storage disk cartridge comprising:
   a housing assembly having an opening for accessing a disk;
   a molded shutter assembly operably connected to the housing assembly, moveable between a closed position across the opening and an open position allowing access to the disk by a disk drive, the molded shutter assembly including a first sidewall, a second sidewall, and an endwall extending between the first sidewall and the second sidewall, wherein a first joint is defined by a junction of the first sidewall and the endwall, and a stress relief mechanism positioned at the first joint, wherein the stress relief mechanism includes a depression formed into an interior surface of the shutter assembly such that a thickness of the molded shutter assembly at the stress relief mechanism is reduced relative at least to one of the first sidewall and endwall whereby the first sidewall is controllably maintained in a desired position relative to the second sidewall after removal from a mold assembly.

2. The data storage disk cartridge of claim 1, wherein the stress relief mechanism provides for the first sidewall to be maintained substantially parallel to the second sidewall.

3. The data storage disk cartridge of claim 1, further comprising a disk operably positioned within the housing assembly.

4. The data storage disk cartridge of claim 1, wherein the stress relief mechanism is geometrically shaped.

5. The data storage disk cartridge of claim 1, wherein the shutter assembly has a rotary configuration to rotate about a central mounting point of the housing assembly.

6. The data storage disk cartridge of claim 1, wherein at least a portion of the stress relief mechanism is formed in the first sidewall.

7. The data storage disk cartridge of claim 1, wherein at least a portion of the stress relief mechanism is formed in the endwall.

8. The data storage disk cartridge of claim 1, wherein at least a portion of the stress relief mechanism is formed in the first sidewall and the endwall.

9. The data storage disk cartridge of claim 1, further wherein a second joint is defined by a junction of the second sidewall and the endwall, and a second stress relief mechanism positioned at the second joint.

10. The data storage disk cartridge of claim 1, wherein the first stress relief mechanism extends along a length of the first joint and the second stress relief mechanism extends along a length of the second joint.

11. The data storage disk cartridge of claim 1, wherein the shutter assembly is injection molded.

12. The data storage disk cartridge of claim 1, wherein the shutter assembly is made of a polymeric material.

13. The data storage disk cartridge of claim 12, wherein the polymeric material is acetyl.

14. The data storage disk cartridge of claim 1, wherein the first joint is rounded.

15. The data storage disk cartridge of claim 1, further comprising an outer housing operably positioned about the housing assembly.

16. A data storage disk cartridge comprising:
   a housing assembly having an opening for accessing a disk;
   a molded shutter assembly operably connected to rotate about a central mounting point of the housing assembly, the molded shutter assembly being moveable between a closed position across the opening and an open position allowing access to the disk by a disk drive, the molded shutter assembly including a first sidewall, a second sidewall, and an endwall extending between the first sidewall and the second sidewall, wherein a first joint is defined by a junction of the first sidewall and the endwall, and means for relieving stress between the first sidewall and the endwall, positioned at the first joint, whereby the first sidewall is maintained substantially parallel to the second sidewall, wherein the means for relieving stress includes a depression formed into an interior surface of the molded shutter assembly such that a thickness of the molded shutter assembly at the means for relieving stress is reduced relative to at least one of the first sidewall and endwall.

17. The data storage disk cartridge of claim 16, wherein the means for relieving stress is molded integral the molded shutter assembly.

18. The data storage disk cartridge of claim 16, further comprising a disk operably positioned within the housing assembly.

19. A data storage disk cartridge comprising:
   a housing assembly having an opening for accessing a disk;
   a molded shutter assembly operably connected to the housing assembly, moveable between a closed position across the opening and an open position allowing access to the disk by a disk drive, the molded shutter assembly including a first sidewall having a first major surface, a second sidewall having a second major surface, and an endwall extending between the first sidewall and the second sidewall having a third major surface, wherein a first interior joint is defined by a junction of the first major surface and the third major surface, and a surface depression is formed into an interior surface of the molded shutter assembly at the first interior joint such that a thickness of the molded shutter assembly at the surface depression is reduced relative to at least one of the first sidewall and endwall maintaining the first sidewall substantially parallel to the second sidewall after removal from a mold assembly.

20. The data storage disk cartridge of claim 19, wherein the surface depression is molded integral the molded shutter assembly.

21. The data storage disk cartridge of claim 19, further comprising a disk operably positioned within the housing assembly.

22. The data storage disk cartridge of claim 19, wherein the surface depression is geometrically shaped.

23. The data storage disk cartridge of claim 19, wherein the surface depression is substantially round.

24. The data storage disk cartridge of claim 19, wherein at least a portion of the surface depression is formed in the first major surface.

25. The data storage disk cartridge of claim 19, wherein at least a portion of the surface depression is formed in the third major surface.

26. The data storage disk cartridge of claim 19, wherein at least a portion of the surface depression is formed in the first major surface and at least a portion of the surface depression is formed in the third major surface.

27. The data storage disk cartridge of claim 19, further wherein a second interior joint is defined by a junction of the second major surface and the third major surface, and a second surface depression positioned at the second interior joint.

28. The data storage disk cartridge of claim 27, wherein the first surface depression extends along the length of the first interior joint and wherein the second surface depression extends along the length of the second interior joint.

29. The data storage disk cartridge of claim 19, wherein the endwall is generally arc shaped.

* * * * *